Patented Jan. 2, 1940

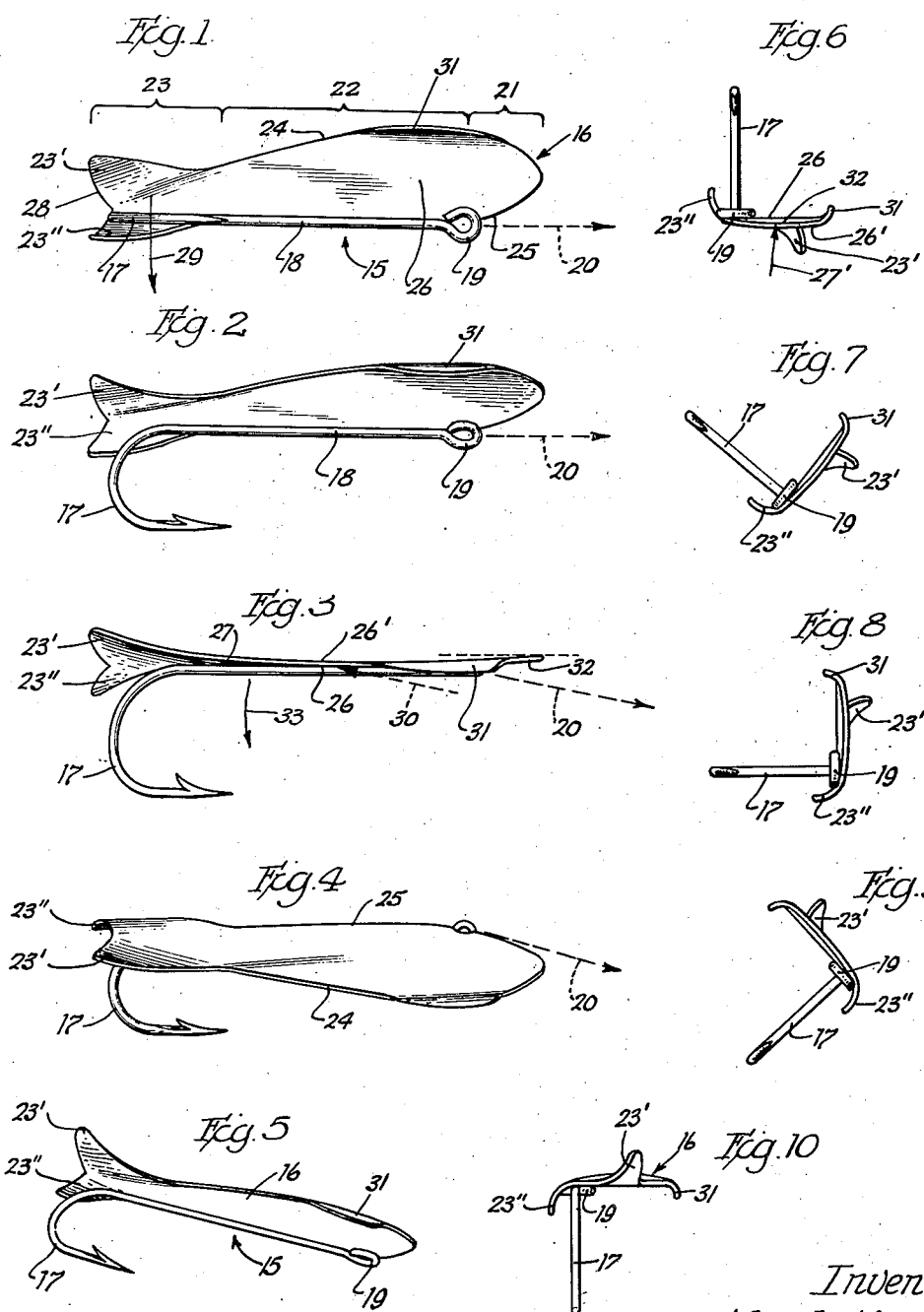

2,185,771

UNITED STATES PATENT OFFICE 2,185,771

FISH LURE

Lloyd Mann, Glenview, Ill.

Application February 10, 1937, Serial No. 125,088

10 Claims. (Cl. 43—47)

The invention relates generally to fishing tackle, and more particularly to a fish lure of the type constructed to simulate a minnow in form and action.

An important object of the present invention is to provide a fish lure of this character which is light in weight and constructed to present but a slight drag so that in its smaller sizes it is particularly suitable for use by fly fishermen.

Another object is to provide such a fish lure arranged to simulate the natural swimming movements of a minnow, and constructed to prevent upsetting or continuous turning or rotation of the minnow during the retrieving movement thereof.

Another object is to provide such a lure adapted to be constructed from tempered steel so as to withstand rough handling.

Other objects and advantages will become apparent from the following description, taken in connection with the accompanying drawing, in which:

Fig. 1 is a plan view of a fish lure, embodying the features of the invention, the lure being shown twice the actual size used with a No. 2 hook, and with the body of the minnow located in a horizontal plane.

Figs. 2, 3 and 4 are views similar to Fig. 1 showing the lure in different positions as it is rotated about the axis of the hook shank.

Fig. 5 is a perspective view of the lure.

Figs. 6, 7, 8 and 9 are front end views of the lure in different positions to correspond with the positions shown in Figs. 1 to 4 inclusive.

Fig. 10 is a rear end view of the lure with the body of the minnow in a horizontal plane and the hook extending downwardly from the minnow.

For purposes of disclosure, I have illustrated in the drawing and will hereinafter describe in detail the preferred embodiment of the invention, with the understanding that I do not intend to limit my invention to the particular construction and arrangement shown, it being contemplated that various changes may be made by those skilled in the art without departing from the spirit and scope of the appended claims.

In the form chosen for disclosure herein the invention is embodied in a relatively small sized lure 15, which is shown in the drawing at twice its actual size, the lure 15 comprising a minnow portion 16 with a hook 17 permanently fixed thereto. Preferably the hook 17 is of a conventional type, such the "No. 2, Model Perfect, 3X shank" herein shown, wherein a shank 18 extending from the hook terminates in an eye 19 which is so positioned that the eye may be used to attach a leader or fish line 20 to the lure as indicated by a dotted line in Figs. 1 to 4.

The minnow 16 is preferably made from a relatively flat sheet of metal such as tempered or spring steel so that the desired form of the minnow will be preserved even though it be subjected to rough usage. The thickness of the steel used for the minnow 16 has been found to be inter-related to the size or weight of the hook 17 of the lure, it being found that when a No. 2 hook is used, a metal thickness of .015 inch is desirable. When a No. 50 hook is used, a metal thickness of .025 is desirable.

In the preferred form illustrated herein the flat sheet of spring steel of .015 inch thickness is cut to a form which simulates the side elevational shape or form of a minnow, this form being indicated in Fig. 1 as comprising integral head, body and tail sections 21, 22 and 23 respectively, all bounded on opposite side edges by a continuous upper edge 24 and a continuous lower edge 25. Preferably the body portion 22 is arranged to lie in a common plane as shown in Fig. 3, and the hook 17 is attached to the minnow by securing the shank 18 to one side surface or face 26 of the body portion 22 as by means of hard soldering indicated at 27 (Fig. 3).

In attaining the objects of the present invention I prefer to position the shank 18 immediately adjacent to the relatively straight lower edge 25 of the body portion 22 with the hook 17 lying in a plane substantially perpendicular to the plane of the body portion 22. With this arrangement, the minnow is made of such a size that the hook 17 curves gradually away from the shank 18 substantially at the rear end of the body portion 22, while the eye 19 of the shank 18 is located at the edge 25 at the junction of the head and body portions 21 and 22 of the minnow.

When the lure is cast, and the retrieving action started, the lure may, for purposes of description, be considered as assuming the position shown in plan in Fig. 1, and means is provided on the lure to act during the retrieving movement to impart a motion thereto which simulates the swimming movements of a minnow. This means acts during the retrieving movement to swing the tail of the minnow laterally back and forth with respect to the line axis and simultaneously to oscillate the minnow about an axis generally parallel to the line axis, and this means is so arranged that the minnow does not upset or spin.

In attaining the desired swimming motion of the lure it will be seen that the weight of the hook along the edge 25 will tend to give a counter-clockwise motion to the lure from the position of Fig. 6, the center of buoyancy or upward pressure of the water on the then lower face (indicated as face 26') of the minnow being substantially at the point indicated by the arrow 27'. This action is, however, minimized by the action of the line 20 which is applying a force forwardly at the eye 19 of the hook; and therefore, additional means is provided to impart such counter-clockwise movement to the minnow. This additional means is preferably arranged to be actuated by the retrieving movement of the lure, and as herein shown, comprised the upper and lower fin sections 23' and 23'' of the tail portion 23 of the minnow. The upper and lower tail fins 23' and 23'' are in part defined by a notched rear edge 28.

Thus the upper fin 23' is curved away from the hook, or to the right (Fig. 8), while the lower fin 23'' is curved toward the hook, or to the left, to form, in effect, a propeller, resisting forward movement of the minnow in such a manner as to induce the desired counter-clockwise motion.

In order that the tail portion 23 may serve also to impart the desired lateral motion to the minnow, as well as condition or position the minnow for a reversal to a clockwise motion, the tail fins 23' and 23'' are bent to different angles so as to have different resistances to forward movement. This difference in formation is best shown in Figs. 5 to 10 wherein it will be seen that the fin 23'' has its concave face parallel to the shank 18 of the hook, while the fin 23' is bent so that its concave surface faces generally forwardly of the lure, and hence the fin 23' presents a greater resistance than the fin 23'' to forward movement of the lure. Thus when the retrieving movement starts from the position of Figs. 1 and 6, the upper fin 23' has the predominating controlling action which causes the tail portion to swing generally in the direction indicated by the arrow 29 in Fig. 1. Hence the lure and the line 20 approach the relation of Figs. 3 and 4, so that the predominating force of the water is applied substantially as indicated by the arrow 30 in Fig. 3, thereby applying a force to the minnow which reverses the rotative movement after it has reached substantially the position of Fig. 4. Upon such reversal the minnow passes back through the succession of positions of Figs. 3, 2 and 1, so as to again render the upper tail fin 23' effective to produce counter-clockwise movement.

To aid in guiding and stabilizing the minnow, there is preferably provided, along the upper edge 24, a transversely extending fin 31 which is relatively small and is located partially along the head portion 21 and partially along the body portion 22. This top fin 31 aids to some extent in preventing the rear end of the lure from sinking as the lure passed through the position of Fig. 8 wherein the principal portions of the minnow body are located in a vertical plane; and also aids in preventing upsetting of the minnow during fast retrieving thereof.

In a device of this character the relative rate of the swimming movements of the minnow is usually considered important, and to increase this relative rate of oscillation, the forward end or head portion 21 of the minnow is preferably curved slightly toward the side 26', that is, away from the hook-side of the minnow as shown in Fig. 3. With this form of the forward end of the minnow, and with the forward force of the line 20 applied at the eye 19, the water acts on the side surface 32 of the head 21 to tend to produce a swinging movement of the minnow in the direction indicated by the arrow 33 in Fig. 3. Thus the surface 32 augments the action of the tail fin 23' and causes the minnow to reach the relation of Figs. 3 and 4 in a relatively less time interval; and hence a quicker reversal of the movement is obtained.

It will be evident that the force 30 (Fig. 3) of water is in effect applied to the face 26 substantially on the longitudinal central axis of the minnow, that is, substantially midway between the side edges of the minnow, while the forward or retrieving force is applied by the line 20 at the eye 19 which is located eccentrically of the longitudinal central axis. Thus the location of the eye 19, or point of line attachment, laterally or eccentrically of the central axis, causes a cooperative action of the unbalanced tail fin construction and the side face 26 in producing the swimming movement of the minnow.

Since the present fish lure has a minnow body which is relatively thin and flat, it is correspondingly light in weight and presents but a slight drag. Hence, when embodied in its smaller sizes, the present lure is suited to the requirements and desires of fishermen who normally prefer fly fishing, while being readily adaptable in larger sizes for other types of fishing.

I claim as my invention:

1. A fish lure of the character described comprising, in combination, a minnow formed from a relatively thin sheet of metal to provide integral head, body and tail portions, said body portion being relatively flat and said tail portion having fin sections merging with opposite edges of the body portion and bent in opposite directions to a generally propeller like form, a hook mounted in fixed position on said minnow and projecting therefrom in a plane substantially perpendicular to said body portion and adjacent to said tail portion, said hook having a shank terminating in an eye and being positioned on said minnow with said shank extending along one side surface of the body portion and adjacent to one edge of said body portion with said eye located at said one edge adjacent to the juncture of said body and head portions for attachment of a line to the lure, the tail fin section adjacent the side edge of the minnow which is remote from said one edge along which said shank is positioned being formed to have a greater resistance to forward movement of the lure than the other tail fin section, and a stabilizing fin projecting laterally from said minnow along said other edge adjacent to the juncture of said head and body portions.

2. A fish lure comprising, in combination, a minnow cut from a relatively thin sheet of metal to provide integral head, body and tail portions, and a hook having a shank terminating in an attachment eye, said shank being attached in a fixed relation to one side of said minnow adjacent to one edge thereof with said eye located at said edge adjacent to the juncture of said head and body portions, and with said hook projecting from said minnow adjacent to said tail portion.

3. A fish lure comprising, in combination, a minnow cut from a relatively thin sheet of metal to provide integral head, body and tail portions, and a hook having a shank terminating in an attachment eye, said shank being fixed to one side of said minnow adjacent to one edge thereof with said eye located at said edge adjacent to the juncture of said head and body portions, and with said hook projecting from said minnow adjacent to said tail portion, said tail portion at the other edge of said minnow being bent in a direction away from said side to which said hook is fixed to provide a propeller-like surface to resist forward movement of the minnow and thereby cause the minnow to move over said hook and to swing laterally with respect to the axis of the line to which the lure is attached.

4. A fish lure of the character disclosed comprising, in combination, a minnow formed from a relatively thin sheet of spring metal to provide integral head, body and tail portions, a hook attached to said minnow so as to project therefrom adjacent said tail section, and an attachment eye fixed to said minnow substantially at the juncture of said head and body portions and eccentrically of the longitudinal central axis of the minnow, said minnow being formed with surfaces tending, when the line is retrieved, to cause partial rotation of said lure in one predetermined direction about an axis generally parallel to the line of retrieving movement, and to cause a simultaneous swinging movement of the lure laterally of said line of retrieving movement.

5. A fish lure comprising, in combination, a relatively thin sheet of metal cut to simulate the side elevational form of a minnow, said minnow having a relatively flat body portion and integral head and tail portions, a hook secured in fixed position on said minnow and projecting therefrom adjacent to the tail of the minnow, and an attachment eye secured in fixed relation to said minnow adjacent to one side edge thereof and adjacent to the forward extremity of said body portion, said head portion being formed forwardly of said eye to provide a surface tending by resistance to forward retrieving movement of said lure to swing the lure laterally about a generally vertical axis with respect to the line of retrieving movement, and means on said minnow operable by resistance to retrieving movement to tend to produce a rotative movement of the lure about an axis generally parallel to such line of retrieving movement.

6. A fish lure comprising, in combination, a minnow formed from relatively thin spring metal to provide a relatively flat body portion with integral head and body portions, and a hook having a shank terminating in an eye and fixed to one side surface of said minnow with said shank extending along said surface adjacent to one edge and with the hook projecting away from the plane of said body adjacent to said tail portion, said tail having fin portions adjacent opposite edges of the minnow, the tail fin adjacent the edge to which said hook is attached being bent laterally toward said hook so as to form a concave surface substantially centered on the axis of said shank, and the other tail fin being bent in the opposite direction to form a concave surface centered on an axis lying at an angle to said shank axis and facing generally forwardly of the minnow.

7. A fish lure comprising, in combination, means shaped to simulate the side elevational form of a minnow having head, body and tail portions, a hook attached to said minnow so as to project therefrom adjacent said tail section, said minnow being formed with surfaces adjacent to the rear part of the body portion acting during retrieving movement of the lure to cause partial rotation of said lure in one direction about an axis generally parallel to the line of retrieving movement with a resulting movement of the upper edge of the minnow in a given lateral direction, and to cause swinging movement of the rear end of the lure laterally of said line of retrieving movement and generally in said given lateral direction, and an attachment eye fixed to said minnow substantially at the juncture of said head and body portions and eccentrically of the longitudinally central axis of the minnow whereby after said partial rotation and lateral swinging of the lure, the force of the water on the forward face of the minnow induces a return partial rotation and a return lateral swinging of the minnow.

8. A fish lure comprising, in combination, a minnow formed from relatively thin metal to provide a relatively flat body portion with integral head and body portions, a hook having a shank terminating in an eye and fixed to one side surface of said minnow with said shank extending along said surface adjacent to one edge and with the hook projecting away from the plane of said body adjacent to said tail portion, and with said eye located at said edge adjacent to the forward extremity of said body portion, said tail having fin portions adjacent opposite edges of the minnow, the tail fin adjacent the edge to which said hook is attached being bent laterally toward said hook so as to form a concave surface substantially centered on the axis of said shank, and the other tail fin being bent in the opposite direction to form a concave surface centered on an axis lying at an angle to said shank axis and facing generally forwardly of the minnow, and said head portion forwardly of said eye being bent slightly in said opposite direction.

9. A fish lure comprising a thin and relatively flat non-floating body formed from thin sheet metal to simulate in side elevation the appearance of a minnow having head, body and tail portions, a hook attached to said body so as to project therefrom adjacent to said tail portion, said body having surfaces thereon tending in a forward retrieving movement of the lure to cause simultaneous lateral displacement of said tail portion and partial rotation of said body in one direction, and a line-attachment eyelet positioned on the forward portion of said body in such a relation that in continued retrieving movement of the lure such lateral displacement and rotation of the lure are stopped after but a partial rotation of the lure, and return displacement and rotation induced.

10. A fish lure comprising a thin and relatively flat non-floating body formed from thin sheet metal to simulate in side elevation the appearance of a minnow having head, body and tail portions, a hook attached to said body so as to project therefrom adjacent said tail portion, and means providing tail surfaces and line attachment means cooperating in a retrieving movement of said body to produce non-spinning rocking oscillation of said body about a generally horizontal axis located adjacent to one side edge of said body.

LLOYD MANN.